United States Patent [19]

Haas, Jr.

[11] 4,389,435
[45] Jun. 21, 1983

[54] TOP DRESSED PLATING SURFACE WITH RESILIENT UNDERPAD

[75] Inventor: Frederick T. Haas, Jr., Metairie, La.

[73] Assignee: Mod-Sod Sports Surfaces, Inc., Metairie, La.

[21] Appl. No.: 296,128

[22] Filed: Aug. 25, 1981

Related U.S. Application Data

[60] Continuation of Ser. No. 115,141, Jan. 24, 1980, abandoned, which is a division of Ser. No. 947,036, Sep. 29, 1978, abandoned.

[51] Int. Cl.³ .................. D03D 27/00; D04H 11/00
[52] U.S. Cl. ......................... 428/17; 428/87; 428/95; 428/331
[58] Field of Search ............ 428/17, 87, 95, 331; 273/29 R, 29 A

[56] References Cited

U.S. PATENT DOCUMENTS 3,661,687  5/1972  Spinney ..................... 428/17
4,044,179  8/1977  Haas ........................ 428/95

Primary Examiner—Marion McCamish
Attorney, Agent, or Firm—Schwartz, Jeffery, Schwaab, Mack, Blumenthal & Koch

[57] ABSTRACT

A playing surface for athletic games comprising a stable subsurface, a resilient underpad of specified character, a pile fabric resembling grass and a sand top dressing. The inventive surface is particularly suited for use as a golf green which properly facilitates control of an approach shot and also provides a true putting surface. The playing surface simulates the feel and appearance of natural turf, but has much greater durability and requires less maintenance. By appropriately varying the construction of the surface, it is possible to control its character to provide for a desired type of play.

18 Claims, 1 Drawing Figure

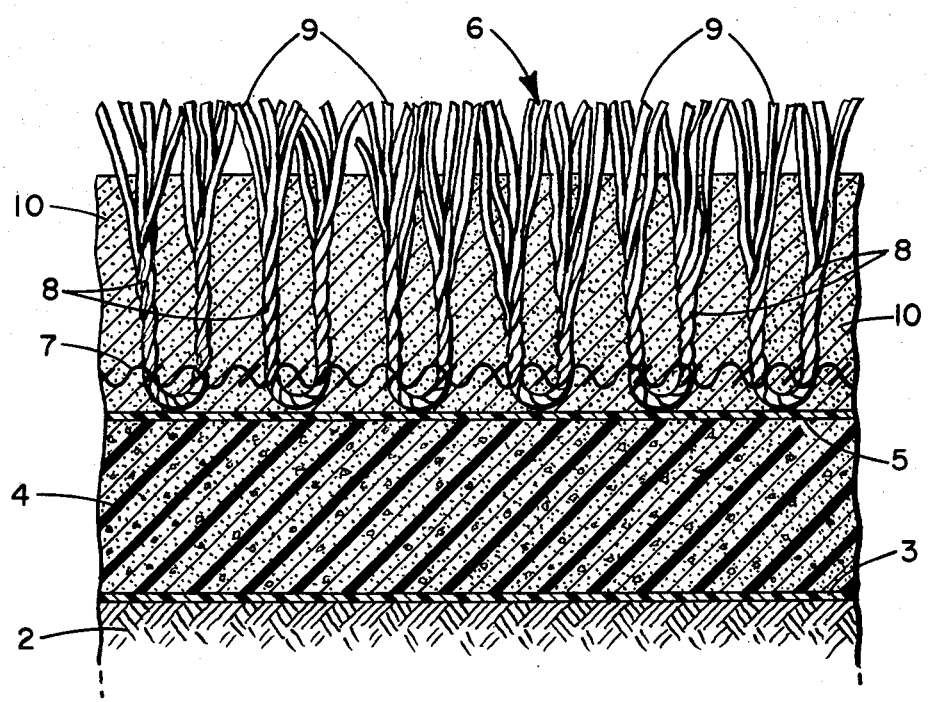

TOP DRESSED PLATING SURFACE WITH RESILIENT UNDERPAD

This is a continuation of application Ser. No. 115,141, filed Jan. 24, 1980; which application is in turn a divisional application of Ser. No. 947,036, filed Sept. 29, 1978, both now abandoned.

FIELD OF THE INVENTION

This invention relates to playing surfaces for athletic games. More specifically, the invention relates synthetic turf playing surfaces which closely duplicate the appearance and physical characteristics of natural turf playing surfaces.

BACKGROUND OF THE INVENTION

A natural grass turf covering has traditionally been cultivated on most playing areas for athletic games. Grass is considered highly desirable both because it stabilizes the soil thereby limiting problems with mud or dust and also because of its attractive appearance. However, maintenance of natural grass turf on athletic playing areas is very expensive at best and is practically impossible on areas subjected to continuous heavy usage.

In order to minimize the expense of maintaining athletic playing areas as well as to increase the durability of the playing surfaces, attempts have been made to substitute synthetic turf for natural turf. However, the results of prior efforts have left much to be desired. Particularly severe problems arise, for example, in the construction of golf greens.

A good golf green must facilitate two types of shots. The first is the approach shot in which a golfer hits the ball from the fairway through the air onto the green. The second is the putt in which the golfer knocks the ball so that it rolls across the green into the cup.

On natural turfs, a good golfer can manage his approach shot onto the green in such a way that the bounce of the ball is limited and the ball does not move unreasonably far from the point of initial impact. In an effort to achieve some degree of resilience, some prior art synthetic turfs have incorporated an elastomeric foam underlay or backing similar to a carpet pad. Synthetic turfs with foam backing are typlified by the materials in Faria, U.S. Pat. No. 3,332,828 and Spinney, U.S. Pat. No. 3,661,687. When such materials are used for golf greens, and an approach shot is made onto the green, the ball generally bounces abnormally and uncontrollably so that it is not possible for even the best of golfers to properly manage his approach shot. Often the ball will keep on bouncing out of control until it bounces right off the green.

Moreover, when a ball is putted on greens made of such synthetic turfs, the grain of the pile fabric, which is inherent in all such materials, affects the direction or course of motion of the ball in an unnatural manner. Consequently, such materials do not provide true putting or chipping surfaces.

Additional problems in putting arise with such surfaces in that they provide too much or too little resistance of the motion of a ball rolling across the surface. When the surface provides too much resistance to the motion of the ball, it is said to be a slow surface. A surface which provides too little resistance to the motion of the ball is termed a fast surface.

Improved artificial playing surfaces for athletic games are disclosed in my prior U.S. Pat. Nos. 3,995,079 and 4,044,179. The '079 patent discloses golf greens formed from a turf-like pile fabric top dressed with noncompacting granular material such as granulated coal slag, crushed flint or crushed granite. Such golf greens do enable a golfer to manage his approach shot onto the green properly, but the top dressing materials generally are not readily available. Consequently, undesirable expense and difficulty may be encountered in installing such a green. It would be desirable if a satisfactory green could be produced by top dressing the green with a commonly available material such as sand. Sand, however, has been found to compact to form a dense hard layer which does not provide the needed shock absorbing characteristics for a golf green. My U.S. Pat. No. 4,044,179 shows a playing surface for athletic games comprising a pile fabric with piles resembling grass disposed upon a firm, stable subsurface and top dressed with sand containing a small amount of moisture modifying material. The sand top dressing compacts to form a dense, hard layer. This type of surface is well suited for tennis courts and also can be used for baseball, soccer and other games. Surfaces of this type are not entirely satisfactory for use as golf greens because the compaction of the top dressing limits the shock absorbing ability of the surface thereby making it difficult for a golfer to properly manage his approach shot onto the green.

OBJECTS OF THE INVENTION

It is an object of the present invention to provide a playing surface for athletic games which is top dressed with readily available material.

It is also an object of the present invention to provide a playing surface for athletic games particularly well adapted for use as a golf green.

A further object of the present invention is to provide a playing surface for athletic games which when used as a golf green facilitates proper management of an approach shot onto the green.

Yet another object of the present invention is to provide a playing surface for athletic games which when used as a golf green provides a true putting surface.

A further object of the present invention is to provide a playing surface for athletic games which when used as a golf green provides a putting surface which is neither too fast nor too slow.

Another object of the invention is to provide a playing surface in which the speed of the surface can be controlled to a desired level.

Another object of the present invention is to provide a playing surface for athletic games which is easier and less expensive to maintain than natural turf.

It is also an object of the present invention to provide a playing surface for athletic games which is more durable in use than natural turf.

A further object of the present invention is to provide a playing surface for athletic games which will partially absorb the momentum and thereby dampen the rebound of an object impacting upon the surface.

It is also an object of the present invention to provide a playing surface for athletic games which provides a natural footing for a player.

Yet another object of the invention is to provide a playing surface which is useful as a golf green and also for other types of games.

SUMMARY OF THE INVENTION

These and other objects of the invention are achieved by providing a playing surface for athletic games comprising a firm, stable subsurface; a resilient compressable underpad from ¼ to 1¼ inches thick; a pile fabric having a flexible backing and normally upstanding pile elements resembling grass; the length of said pile elements being substantially uniform and lying in the range from ½ to 1½ inches; and a compacted top dressing layer of sand having a particle size in the range from 10 to 200 U.S. screen mesh interspersed on the backing among the pile elements to a substantially uniform depth at least ½ the length of the pile elements; the combination of subsurface, underpad, pile fabric and top dressing providing natural footing for players and exerting a damping effect upon objects impacting on the surface.

BRIEF DESCRIPTION OF THE DRAWING

The FIGURE is a sectional view through an athletic playing surface according to the present invention.

DETAILED DESCRIPTION OF THE PREFERRED EMBODIMENTS

The drawing figure comprises a sectional view through a playing surface according to the present invention. The playing surface 1 starts with a firm, stable subsurface 2 upon which the remainder of the playing surface is constructed. A moisture barrier layer 3 is disposed over subsurface 2. Next, a resilient underpad 4 is placed over the moisture barrier layer. A second moisture barrier 5 is positioned over the resilient underpad to prevent moisture from penetrating the underpad. A pile fabric 6 with generally upstanding pile elements resembling grass is positioned on top of moisture barrier 5. In the drawing the pile fabric 6 is depicted as a woven fabric backing 7 through which a plurality of segments of multifilament yarn 8 have been tufted to form the upstanding piles. At the free ends of the tufts, the individual filaments 9 can be seen. Among the pile elements on the backing there is a compacted layer of sand top dressing 10.

Subsurface 2 establishes the contour of the playing surface. In order to provide a good playing surface, the subsurface must be smooth. For a golf green it is not necessary that the surface be either level or flat, but it must be free of waves and ripples. Subsurface 2 should be sufficiently compacted that it will not settle or shift after installation of the playing surface but will provide a firm, stable foundation for the playing surface. The subsurface 2 may consist of concrete or asphalt pavement, compacted clay, gravel rolled into ordinary dirt or any of a number of other firm materials. A four inch thick layer of traffic bond provides a particularly suitable subsurface. Adequate subsurface drainage should be provided. For golf greens, it will be appreciated that an irregularly contoured subsurface will be desirable. For most other games (e.g., tennis, baseball, etc.) a flat, generally level surface will be preferred. A slight slope may be provided to facilitate surface drainage.

Moisture barrier layer 3 functions to reduce water penetration and heaving and to protect the resilient underpad from ground moisture. If the subsurface consists of concrete or asphalt pavement, moisture barrier layer 3 may be dispensed with. A suitable moisture barrier layer may be formed with polyethylene sheeting between 2 and 10 mils thick such as is sometimes used as a vapor barrier in pouring concrete. A 6 mil thick sheet has been found to produce excellent results. Another suitable material for the moisture barrier layer is commercial asbestos roofing felt between thirty and one hundred pound weight, preferably about seventy pound weight.

Resilient underpad 4 serves to dissipate the shock of objects impacting upon the playing surface. Thus, the underpad 4 fosters control of the ball by slightly deadening the ball's bounce and also increases player comfort by absorbing some of the shock of the athlete's footfalls. Foam underpads are preferred for most applications. For example, commercial rebonded urethane foam consisting of shredded urehane foam particles bonded together under pressure has been utilized as a playing surface underpad with excellent results. The density of the rebonded foam should range between about 3.5 and about 20 pounds per cubic foot. This is somewhat more dense than the usual carpet underpad foams which typically have a density between about 2.5 and about 3.5 pounds per cubic foot. The thickness of the underpadding may vary from about ¼ inch to about 1¼ inches depending upon the intended use of the playing surface. A thicker underpad is required for a football field than is needed for a tennis court. The compression factor of the resilient underpad may range between about seventy-five and about one hundred thirty pounds. The compression factor is defined as the force required to compress a four inch square piece of the foam to one inch. A good golf green underpad will have a density from eight to twelve, preferably about ten pounds per cubic foot, a thickness of ⅜ to ½, preferably about ½ inch and a compression factor of about one hundred pounds. A good tennis court underpad will have a density from about eighteen to about twenty, preferably near twenty pounds per cubic foot, a thickness of ¼ to ⅜ inches, preferably about ¼ inch, and a compression factor of about one hundred twenty-five pounds or more. If the underpad is too resilient, i.e., has too low a density or is too thick, the surface will feel mushy to a player and will not provide a natural footing. If the underpad has too little resilience, ball control will be much more difficult because there will be too much bounce.

The resilient foam underpad disposed between the two firm surfaces provided by the subsurface 2 and the compacted top dressing 10 establishes a type of air suspension system for the playing surface which gives it its desirable shock absorbing characteristics.

The upper moisture barrier layer 5 protects the underpad from suface moisture and may suitably be formed from the same materials as moisture barrier layer 3.

The pile fabric 6 may be a tufted or knitted pile fabric or any other suitable construction. For reasons of cost as well as flexibility of design, a tufted fabric will generally be preferred. The fabric backing may be any suitable woven, felted or extruded web. A particularly preferred backing is a woven polypropylene fabric having a weight of about twenty-five ounces per square yard. Tufted through the backing are segments of a multifilament yarn made from ⅜ gauge polypropylene ribbon five mils thick which is slit and twisted to form a plurality of thin filaments. Normally, each strand of yarn will comprise from twenty to fifty or more individual filaments. In order to provide a pleasing natural appearance, the polypropylene typically is dyed a green color. Suitable color stabilizers are incorporated into the polypropylene to prevent color degradation resulting from exposure of the playing surface to the elements over a period of time.

The density of the tufts may vary depending upon the weight of the multifilament yarn and the intended use of the playing surface. For the previously mentioned ⅜ gauge, 5 mil thick polypropylene ribbon yarns, tuft densities ranging from eight to twenty-four tufts per square inch are useful. This corresponds to stitch rates from about three to about eight stitches per inch on conventional tufting machines which produce 2⅝ rows of tufts per inch. For a golf green the preferred tuft density will range from 10 to 16 tufts per square inch. For a tennis court, the density should be somewhat higher, preferably from 16 to 22 tufts per square inch.

The length of the pile elements may range from about ¼ to about 1½ inches. In most instances, the pile length will be between ½ and 1 inches. Outstanding golf greens and tennis courts have been produced utilizing pile fabrics with ¾ inch long piles. The tufted piles function to stabilize the top dressing against shifting and/or erosion and also give color to the playing surface.

The playing surface is top dressed with a layer of compacted sand 10. The depth of the sand layer should be at least one-half the length of the pile elements and also must be substantially uniform over the entire playing surface. Sand having a U.S. screen mesh size between 10 and 200 is used for the top dressing. Preferably, the top dressing consists of a mixture of three sand fractions: from 20-50% 10 to 40 U.S. screen mesh size sand, from 30-60% sand having a particle size from 40 to 70 U.S. screen mesh and 20-50% sand in the 40 to 200 U.S. screen mesh particle size range. It is important to have a mixture of sand from the different particle size ranges. If the top dressing comprises too large a proportion of large particles, it may not compact sufficiently but will be subject to shifting, and a ball impacting thereon will bounce irregularly and roll poorly. If the top dressing comprises too large a proportion of small particles, it will be mucky when wet, dusty when dry and the shock absorption of the playing surface will be impaired. In order to optimize the interaction between a ball on the playing surface and the top dressing, it has been found desirable to have the surface layer consist predominantly of granules in the 10 to 40 U.S. screen mesh size range.

Optionally, a small proportion of coloring material may be incorporated in the dressing to enhance the appearance of the playing surface. For contact sports such as football, rugby, soccer and the like where players may fall on the surface, non-abrasive materials such as cork granules or rubber pellets mixed with fine sand or silt may advantageously be utilized as or incorporated into the top dressing. Also, for indoor use or in a dry climate, it may be helpful to incorporate a small amount of moisture retaining material in the top dressing as described in U.S. Pat. No. 4,044,179. Use of sand having the proper particle size distribution may minimize or eliminate the need for any moisture modifying material.

The depth of the top dressing should be correlated with the length of the pile elements so that the tips of the piles project the desired distance above the top dressing. Generally, the pile elements will project ½ inch or less above the top dressing. For tennis courts or golf greens the projection of the pile elements will ordinarily lie in the range from 1/64 to ¼ inch. The shorter the projection of the pile elements above the top dressing, the less surface water the playing surface will retain and the sooner the surface may be played upon after a rainstorm.

The top dressing functions to stabilize the piles and prevent graininess. Ordinarily the pile elements of a pile fabric will have a characteristic grain (i.e., tendency to lay in a given direction related to the direction in which the material passed through the production machinery). The top dressing counteracts this tendency and prevents the playing surface from having a noticable grain. The top dressing also functions to absorb some of the shock of an object impacting on the playing surface and affects the roll of a ball over the surface.

Optionally, the underside of the pile fabric may be provided with a resinous coating which functions to secure the tufts in place, to increase the dimensional stability of the backing and to increase the moisture resistance of the backing. A preferred manner of coating the backing is to contact the back of the pile fabric with a solution of polyvinyl chloride in a volatile, nonaqueous solvent and then subject the pile fabric to a heat treatment to evaporate the solvent and cure the PVC coating. Conventional rubber latex coatings can also be utilized. The resinous coating is also sometimes referred to as a secondary backing and may also be considered as a moisture barrier. Thus, it may be possible to omit moisture barrier 5 if the back of the pile fabric is provided with a suitable resinous coating.

For games such as tennis or football the pile fabric optionally may be subjected to a heat treatment to induce a slight crimping of the free ends of the filaments of the piles. Crimping the pile filaments provides the pile fabric with a firmer, denser, slightly roughened surface which results in a more natural appearance of the final playing surface and also improves the footing for athletes playing on the surface. Crimping of the piles may also be resorted to in order to provide a "slower" playing surface. For polypropylene yarn piles suitable crimping may be effected by passing the pile fabric through an oven at 285° F. for a period of ten to twelve minutes. Adjustments to temperature and time may be required depending on the character of the multifilament yarn used in the piles and the degree of crimping desired.

The character of the playing surface can be controlled by varying its construction. For example, the "speed" of a golf green depends inter alia, upodn the size of the granules at the surface of the top dressing, the length of projection of the piles above the dressing, the density of the pile elements and the degree of crimping of the pile filaments. In order to provide a faster golf green, i.e., one upon which a ball will roll more freely, one can decrease the size of granules at the surface of the top dressing, decrease the projection of the pile elements above the dressing, increase the density of the pile elements, increase the degree of crimping of the pile filaments, or any combination of the foregoing. In order to produce a slower golf green, the opposite measures may be taken. To produce a slower tennis court, i.e., one in which the ball undergoes a greater degree of vertical bounce, one can decrease the projection of the pile elements above the top dressing and/or increase the size of the granules on the surface of the top dressing. Heat treating the pile fabric to crimp the filaments also will produce a slower tennis court. Similar adjustments can be made for other sports. It is thus possible to tailor the character of the playing surface in order to provide the type of play desired.

Installation of the playing surface according to the invention begins with proper preparation of the subsurface to assure a stable, firm surface which will not shift or settle and which has smooth contours free of waves or ripples. Once the subsurface is prepared, the moisture barrier, if one is to be used, can be put down. The resilient underpad is then laid over the moisture barrier. Desirably, adjacent sections of the underpad will be taped together to prevent shifting and separation. The underpad is covered by the upper moisture barrier, and the pile fabric is then spread out over the upper moisture barrier and trimmed as needed. Adjacent sections of the pile fabric must be seamed together. Seaming can suitably be effected either with hot seaming tape or with adhesive and tape. If the character of the subsurface permits, spikes may be driven through the pile fabric, underpad and moisture barriers to further stabilize the playing surface against shifting. This may be advisable in areas where stress is repeatedly applied to the playing surface such as near the service line and/or the baseline of a tennis court. A series of seven inch spikes arranged at six to eighteen inch intervals in a zig-zag pattern behind the baseline has been found to be helpful. After the pile fabric is in place, the sand dressing is applied with conventional spreading equipment. During application of the dressing, the piles should be periodically brushed to the upright position as needed. Brushing or sweeping also helps to level out the top dressing. After application of the top dressing, the playing surface is ready for use. Playing surfaces according to the invention are useful as golf greens, tennis courts or for other sports such as baseball, track, or soccer.

A playing surface particularly suitable for use as a golf green was constructed utilizing a ½ inch thick layer of rebonded urethane foam having a density of ten pounds per cubic foot and a compression factor of ninety-nine pounds and also utilizing a polypropylene tufted pile fabric having a tuft density of 13.3 piles per square inch, the length of the pile elements being ¾ inch and the projection of the pile elements above the top dressing being approximately 3/16 inch.

A highly satisfactory tennis court can be constructed utilizing a ¼ inch layer of urethane foam having a density of twenty pounds per cubic foot and a compression factor of one hundred twenty-five pounds and further utilizing a pile fabric having a tuft density of 18.6 tufts per square inch, the length of the pile elements being ¾ inch and the projection of the pile elements above the top dressing being approximately 1/16 inch.

Playing surfaces according to the present invention present a very attractive appearance closely resembling the appearance of natural grass turf. Once installed, the playing surfaces of the invention have a very low maintenance cost because they require very little upkeep. At the same time the playing surfaces of the invention are much more durable than natural turf or earthen surfaces and can be used for virtually continuous play for long periods without exhibiting adverse wear. Playing surfaces of the invention provide outstanding player feel. That is to say, they feel to a player as though they were a natural surface with none of the unnatural springiness hitherto characteristic of artifical turf. Furthermore, they are very comfortable and easy on the legs and feet of the player, particularly in comparison with hard pavements such as concrete or asphalt surfaces. A particular advantage is the fact that the characteristics of the playing surface can be readily adjusted according to the type of play desired. Another advantage of the present invention is that suitable top dressing material is readily available almost everywhere.

The foregoing embodiments have been described merely as examples of the invention and are not intended to limit its scope. Since modifications of the described embodiments may occur to persons skilled in the art, the scope of the invention is to be limited solely by the scope of the appended claims.

I claim:

1. A golf green comprising:
 (a) a firm, stable subsurface;
 (b) a resilient, compressible underpad from ¼ to 1¼" thick and having a density from about 3.5 to 12 lbs. per cubic foot;
 (c) a pile fabric having a flexible backing and normally upstanding pile elements resembling grass; the length of said pile elements being substantially uniform and lying in the range from ½ to 1½"; and
 (d) a compacted top dressing layer of sand having a particle size in the range from 10 to 200 U.S. screen mesh interspersed among the pile elements and on the backing to a substantially uniform depth at least ½ the length of the pile elements;
 the combination of subsurface, underpad, pile fabric and top dressing providing natural footing for players and facilitating ball control by dissipating the shock of objects impacting on the surface.

2. A golf green according to claim 1, wherein the pile fabric has a tuft density in the range from 10 to 16 tufts per square inch.

3. A golf green according to claim 2, wherein said underpad is a ½" thick layer of rebonded urethane foam having a density of 10 lbs. per cubic foot; a compression factor of 99 lbs., and said pile fabric is a tufted pile fabric having a tuft density of 13.3 piles per square inch, the length of the pile elements being ¾" long and the projection of the pile elements above the top dressing being approximately 3/16".

4. A playing surface as recited in claim 1 further coprising at least one moisture barrier adjacent the underpad.

5. A playing surface as recited in claim 4 wherein said moisture barrier is disposed between the subsurface and the underpad.

6. A playing surface as recited in claim 5 wherein said moisture barrier is a layer of 30 to 100 lb. weight asbestos roofing felt.

7. A playing surface as recited in claim 4 wherein said moisture barrier is disposed between said underpad and said pile fabric.

8. A method as recited in claim 7 wherein said moisture barrier comprises a polyvinyl chloride coating on the underside of the pile fabric backing.

9. A playing surface as recited in claim 4 wherein said moisture barrier is a 2 to 10 mil thick polyethylene sheet.

10. A playing surface as recited in claim 1 wherein said underpad is a high-density polymeric foam having a density of at least 3.5 lbs. per cubic foot.

11. A playing surface as recited in claim 10 wherein said underpad is a high-density polymeric foam having a density between 8 and 12 lbs. per cubic foot and a compression factor between 75 and 130 lbs.

12. A playing surface as recited in claim 1 wherein said pile fabric is a tufted pile fabric.

13. A playing surface as recited in claim 12 wherein the backing of said tufted pile fabric is a woven polypropylene fabric and the tufts are formed from polypropylene ribbons slit and twisted to form a multifiliment yarn; each end of said yarn comprising from 20 to 50 individual pile filaments; the density of said tufts on said backing ranging between 8 and 24 tufts per square inch.

14. A playing surface as recited in claim 13 wherein said pile fabric is heat treated to slightly crimp the free ends of the pile filaments thereby to enhance the texture of the pile fabric.

15. A playing surface as recited in claim 1 wherein said top dressing comprises 20 to 50% sand having a particle size from 10 to 40 U.S. screen mesh; 30 to 60% sand having a particle size from 40 to 70 U.S. screen mesh, and 20 to 50% sand having a particle size from 70 to 200 U.S. screen mesh.

16. A playing surface as recited in claim 1 wherein the surface layer of said top dressing comprises predominantly sand having a particle size between 10 and 40 U.S. screen mesh.

17. A playing surface as recited in claim 1 wherein said underpad comprises a $\frac{1}{4}$" thick layer of foam having a density of 20 lbs. per cubic foot and said pile fabric is a tufted pile fabric having a tuft density of 18.6 tufts per square inch; the length of the pile elements being $\frac{3}{4}$" and the projection of the tips of the pile elements above the top dressing being approximately 1/16".

18. A playing surface as recited in claim 1 wherein the projection of the tips of the piles of the pile fabric above the top dressing lies in the range from $\frac{1}{4}$ to 1/64".

* * * * *